United States Patent
Ojima et al.

(10) Patent No.: US 11,211,623 B2
(45) Date of Patent: Dec. 28, 2021

(54) FUEL CELL VEHICLE

(71) Applicant: HONDA MOTOR CO., LTD., Tokyo (JP)

(72) Inventors: Kuniaki Ojima, Wako (JP); Takuto Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 16/249,991

(22) Filed: Jan. 17, 2019

(65) Prior Publication Data

US 2019/0229357 A1 Jul. 25, 2019

(30) Foreign Application Priority Data

Jan. 22, 2018 (JP) .............................. JP2018-007931

(51) Int. Cl.
*B60L 50/50* (2019.01)
*B60L 50/75* (2019.01)
(Continued)

(52) U.S. Cl.
CPC ......... *H01M 8/04932* (2013.01); *B60L 50/50* (2019.02); *B60L 58/12* (2019.02);
(Continued)

(58) Field of Classification Search
CPC ......... B60L 58/30; B60L 58/12; B60L 50/50; B60L 2260/22; B60L 2240/12; B60L 2240/10; B60L 58/13; B60L 2270/145; B60L 2270/142; B60L 58/40; B60L 50/75; B60W 10/28; B60W 40/105; H01M 8/04932; H01M 10/48; H01M 8/04753; H01M 10/425; H01M 8/04925; H01M 16/006; H01M 10/46; H01M 10/44; H01M 8/04111; H01M 2010/4271; H01M 2250/20; H01M 2220/20
(Continued)

(56) References Cited

U.S. PATENT DOCUMENTS 9,590,259 B2   3/2017  Toida
2012/0245779 A1*  9/2012  Goto ...................... B60K 6/28
                                                                701/22
(Continued)

FOREIGN PATENT DOCUMENTS

JP       2002-204505       7/2002
JP       2007265653 A  *  10/2007
(Continued)

OTHER PUBLICATIONS

Japanese Office Action for Japanese Patent Application No. 2018-007931 dated Oct. 5, 2021.

*Primary Examiner* — Abby Y Lin
*Assistant Examiner* — Hossam M Abd El Latif
(74) *Attorney, Agent, or Firm* — Amin, Turocy & Watson, LLP

(57) ABSTRACT

A drive upper limit electrical energy for an air compressor is set variably in correspondence with vehicle velocity Vv. In this manner, for example, surplus power generation electrical energy of a fuel cell stack is consumed (discarded) by the air compressor in a range where NV (noise and vibration) of the air compressor does not give passengers any sense of discomfort.

9 Claims, 5 Drawing Sheets

(51) Int. Cl.
| | |
|---|---|
| *B60L 58/12* | (2019.01) |
| *B60L 58/13* | (2019.01) |
| *B60L 58/30* | (2019.01) |
| *B60L 58/40* | (2019.01) |
| *B60W 10/28* | (2006.01) |
| *B60W 40/105* | (2012.01) |
| *H01M 10/42* | (2006.01) |
| *H01M 10/44* | (2006.01) |
| *H01M 10/46* | (2006.01) |
| *H01M 10/48* | (2006.01) |
| *H01M 16/00* | (2006.01) |
| *H01M 8/04858* | (2016.01) |
| *H01M 8/04111* | (2016.01) |
| *H01M 8/04746* | (2016.01) |

(52) U.S. Cl.
CPC ......... *B60L 58/30* (2019.02); *H01M 8/04111* (2013.01); *H01M 8/04753* (2013.01); *H01M 8/04925* (2013.01); *H01M 10/425* (2013.01); *H01M 10/44* (2013.01); *H01M 10/46* (2013.01); *H01M 10/48* (2013.01); *H01M 16/006* (2013.01); *B60L 2240/12* (2013.01); *B60L 2260/22* (2013.01); *H01M 2010/4271* (2013.01); *H01M 2220/20* (2013.01); *H01M 2250/20* (2013.01)

(58) Field of Classification Search
USPC .......................................................... 701/22
See application file for complete search history.

(56) References Cited

U.S. PATENT DOCUMENTS

2016/0133965 A1* 5/2016 Imanishi ........... H01M 8/04231
    429/9
2019/0252741 A1* 8/2019 Gunther ............ H01M 10/6563

FOREIGN PATENT DOCUMENTS

| JP | 2010-049827 | | 3/2010 |
| JP | 2016207435 A | * | 12/2016 |
| WO | 2013/076785 | | 5/2013 |

* cited by examiner

FUEL CELL VEHICLE

CROSS-REFERENCE TO RELATED APPLICATION

This application is based upon and claims the benefit of priority from Japanese Patent Application No. 2018-007931 filed on Jan. 22, 2018, the contents of which are incorporated herein by reference.

BACKGROUND OF THE INVENTION

Field of the Invention

The present invention relates to a fuel cell vehicle which makes it possible to suppress high potential degradation of a fuel cell.

Description of the Related Art

For example, a solid polymer electrolyte fuel cell includes a membrane electrode assembly (MEA). The membrane electrode assembly includes an electrolyte membrane made of a polymer ion exchange membrane, an anode provided on one surface of the electrolyte membrane, and a cathode provided on the other surface of the electrolyte membrane. A power generation cell (a unit cell) is formed by sandwiching the membrane electrode assembly between separators. In general, a predetermined number of power generation cells are stacked together to form, e.g., an in-vehicle fuel cell stack mounted in a fuel cell vehicle (fuel cell electric automobile).

In the fuel cell vehicle, an energy storage device such as a storage battery is provided for storing regenerative electrical energy produced at the time of decelerating a vehicle drive motor, and/or for control of starting/stopping operation of the fuel cell, etc.

In a technique disclosed in Japanese Laid-Open Patent Publication No. 2002-204505 (hereinafter referred to as "JPA2002-204505"), when the charging state (state of charge: hereinafter referred to as the "SOC") of the battery reaches the charging upper limit state, operation efficiency of auxiliary devices is decreased to consume regenerative electrical energy of a motor which is surplus electrical energy (paragraphs [0013] and [0014] of JPA2002-204505).

SUMMARY OF THE INVENTION

In this regard, in the fuel cell, when the potential of the cathode with respect to the anode becomes higher than a normal potential, degradation occurs in a catalyst layer, and the output of the fuel cell is decreased (which referred to as a high potential degradation).

However, in JPA2002-204505, at the time of charging the battery with surplus electrical energy, power generation of the fuel cell is controlled so as to produce a minimum power generation electrical energy (paragraph [0050] of JPA2002-204505). In JPA2002-204505, the fuel cell has I-V characteristics where the potential of the cathode with respect to the anode becomes high. Therefore, high potential degradation is accelerated, and high potential degradation cannot be suppressed. In this sense, there is a room of improvement.

Further, in JPA2002-204505, since surplus electrical energy is consumed by decreasing the operation efficiency of the air compressor as an auxiliary device, noise/vibration (NV) of auxiliary devices such the air compressor gives passengers a discomfort feeling.

The present invention has been made taking such a problem into consideration, and an object of the present invention is to provide a fuel cell vehicle which is capable of consuming surplus power generation electrical energy of a fuel cell while suppressing high potential degradation, in consideration of NV (noise/vibration) generated by an oxygen-containing gas supply unit.

A fuel cell vehicle of the present invention includes a fuel cell configured to supply electrical energy to a load, an oxygen-containing gas supply unit configured to supply an oxygen-containing gas to the fuel cell, a fuel gas supply unit configured to supply a fuel gas to the fuel cell, a power generation control unit configured to control the power generation state of the fuel cell, an energy storage device, a charging state acquisition unit configured to obtain the charging state of the energy storage device, a surplus power generation electrical energy consumption control unit configured to charge the energy storage device with surplus power generation electrical energy of the fuel cell and control the drive state of the oxygen-containing gas supply unit up to drive upper limit electrical energy, in correspondence with the charging state of the energy storage device obtained by the charging state acquisition unit, to thereby consume the surplus power generation electrical energy of the fuel cell, and a vehicle velocity acquisition unit configured to obtain vehicle velocity. The surplus power generation electrical energy consumption control unit is configured to variably set the drive upper limit electrical energy for the oxygen-containing gas supply unit so that the drive upper limit electrical energy depends on the vehicle velocity obtained by the vehicle velocity acquisition unit.

In the present invention, since the drive upper limit electrical energy for the oxygen-containing gas supply unit is set variably in correspondence with the vehicle velocity, it is possible to consume the surplus power generation electrical energy of the fuel cell by means of the oxygen-containing gas supply unit within a range where, e.g., the passengers do not have the sense of discomfort about the NV (noise and vibration) of the oxygen-containing gas supply unit.

In this case, the fuel cell vehicle may further include a load requirement acquisition unit configured to obtain load requirement of the load required in traveling of the fuel cell vehicle, the power generation control unit may be configured to control power generation of the fuel cell in a power generation range higher than the load requirement obtained by the load requirement acquisition unit and in which degradation of the fuel cell is suppressed, and the surplus power generation electrical energy consumption control unit may be configured to cause the oxygen-containing gas supply unit to consume the surplus power generation electrical energy at the time of controlling degradation suppression power generation, by controlling the drive state of the oxygen-containing gas supply unit.

In the present invention, even in the case where the load requirement (required load) is small, the surplus power generation electrical energy (surplus electrical energy) is consumed by the oxygen-containing gas supply unit to thereby perform power generation of the fuel cell in the high load state. In this manner, it is possible to suppress high potential degradation of the fuel cell.

In the case where the charging state of the energy storage device obtained by the charging state acquisition unit reaches a charging state threshold value, when the vehicle velocity obtained by the vehicle velocity acquisition unit indicates an acceleration state, the surplus power generation electrical energy consumption control unit may increase the drive upper limit electrical energy for the oxygen-containing gas supply unit in correspondence with the vehicle velocity.

In the present invention, at the time of accelerating the vehicle, in consideration of NV (noise and vibration), it is possible to suitably consume the surplus electrical energy by means of the oxygen-containing gas supply unit, and suppress the high potential degradation of the fuel cell.

Further, in the case where the charging state of the energy storage device obtained by the charging state acquisition unit reaches a charging state threshold value, when the vehicle velocity obtained by the vehicle velocity acquisition unit indicates a deceleration state, the surplus power generation electrical energy consumption control unit may decrease the drive upper limit electrical energy for the oxygen-containing gas supply unit in correspondence with the vehicle velocity.

In the present invention, at the time of decelerating the vehicle, in consideration of NV, it is possible to suitably consume the surplus electrical energy by the oxygen-containing gas supply unit, and suppress the high potential degradation of the fuel cell.

Further, the oxygen-containing gas supply unit is provided with a bypass channel configured to release the oxygen-containing gas to the outside through a valve. With this structure, by releasing the redundant oxygen-containing gas which is present when the surplus electrical energy is consumed by the oxygen-containing gas supply unit, to the outside (atmosphere) through the valve, it is possible to control the water content of the fuel cell so that the fuel cell can contain the suitable quantity of water.

In the present invention, in consideration of NV (noise and vibration) produced by the oxygen-containing gas supply unit, it is possible to consume the surplus power generation electrical energy of the fuel cell by means of the oxygen-containing gas supply unit while suppressing high potential degradation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell vehicle according to the present invention will be described with reference to the accompanying drawings.
[Structure]

Figure 1:
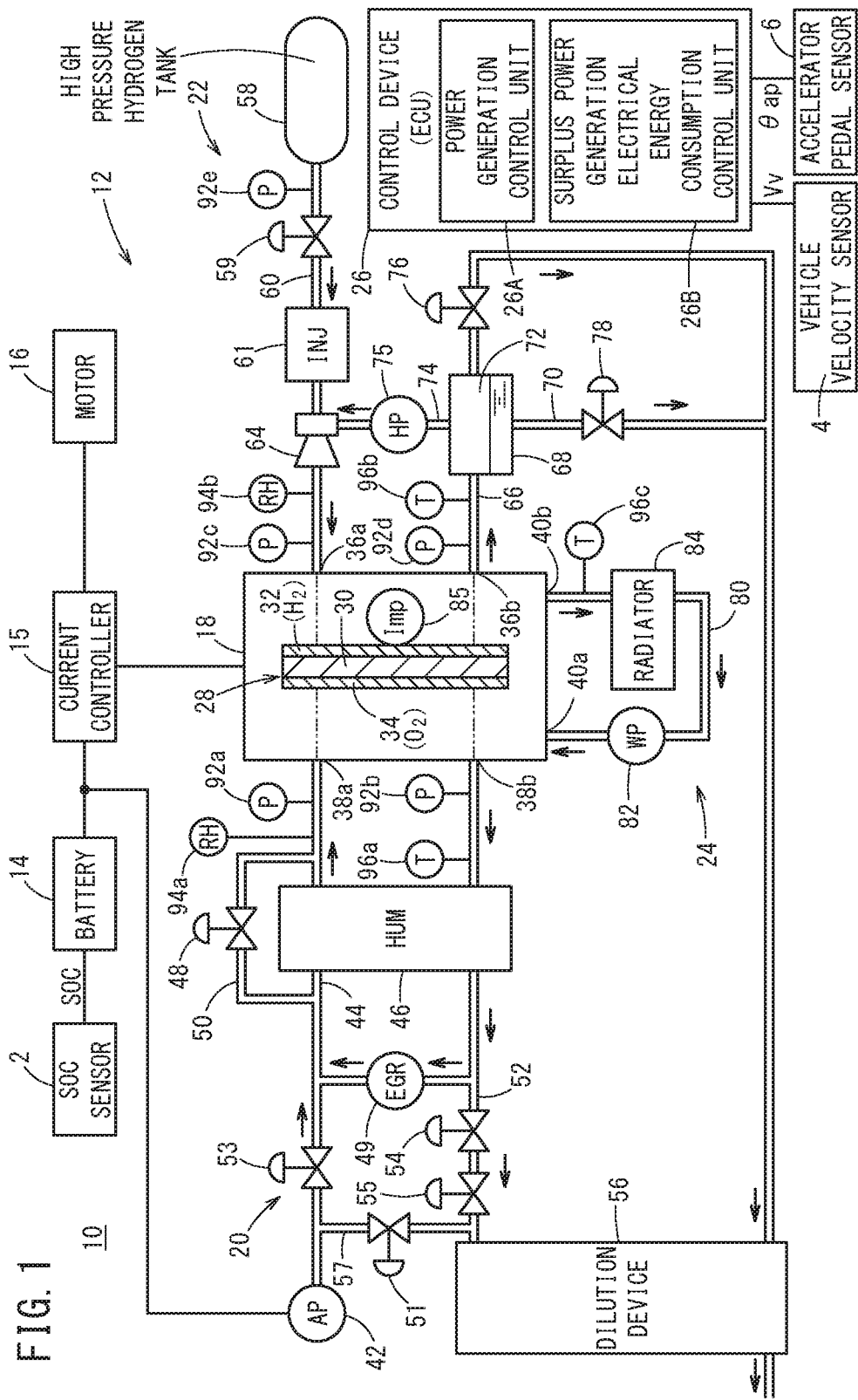
FIG. 1 is a diagram schematically showing structure of a fuel cell vehicle according to an embodiment of the present invention.

As shown in FIG. 1, for example, a fuel cell vehicle 10 according to the embodiment is a fuel cell electric automobile. The fuel cell vehicle 10 includes a fuel cell system 12, a high voltage battery (energy storage device) 14, a current controller 15, and a motor (vehicle driving electric motor) 16. The battery 14 includes a secondary battery, a capacitor, etc.

The fuel cell system 12 includes a fuel cell stack (fuel cell) 18, an oxygen-containing gas supply apparatus 20, a fuel gas supply apparatus 22, a coolant supply apparatus 24, and a control device 26.

The control device 26 comprises an ECU (Electronic Control Unit). The CPU executes programs stored in a memory to function as various control units. In this embodiment, the control device 26 functions as a power generation control unit 26A and a surplus power generation electrical energy consumption control unit 26B, etc.

An SOC sensor 2 is connected to the battery 14. The SOC sensor 2 detects, and obtains the charging state (SOC: State of Charge) of the battery 14.

When an accelerator pedal (not shown) is operated, an accelerator position (accelerator operation quantity) θap is obtained through an accelerator pedal sensor 6. Then, the motor 16 is driven by the control device 26 in correspondence with the obtained accelerator position θap, and a wheel (drive wheel) (not shown) is driven (rotated) through the driven motor 16. The rotational speed of the motor 16 or the rotational speed of the wheel is obtained by a vehicle velocity sensor 4 as vehicle velocity Vv.

The charging state SOC obtained by the SOC sensor 2, the accelerator position θap obtained by the accelerator pedal sensor 6, and the vehicle velocity Vv obtained by the vehicle velocity sensor 4 are inputted to the control device 26.

The oxygen-containing gas supply apparatus 20 supplies an oxygen-containing gas to the fuel cell stack 18, the fuel gas supply apparatus 22 supplies a fuel gas to the fuel cell stack 18, and the coolant supply apparatus 24 supplies a coolant to the fuel cell stack 18.

The control device 26 performs control of the entire fuel cell vehicle 10 and the entire fuel cell system 12 (each of the constituent elements), including control of a current controller 15 through a control line (not shown).

The fuel cell stack 18 is formed by stacking a plurality of power generation cells 28 together. Each of the power generation cells 28 includes an MEA including a solid polymer electrolyte membrane 30, and anode 32 and a cathode 34 on both sides of the solid polymer electrolyte membrane 30. For example, the solid polymer electrolyte membrane 30 is a thin membrane of perfluorosulfonic acid containing water. A fluorine based electrolyte may be used as the electrolyte membrane 30. Alternatively, an HC (hydrocarbon) based electrolyte may be used as the electrolyte membrane 30.

The output (electric energy) of the fuel cell stack 18 is supplied to auxiliary devices (load) such as a motor 16 and an air compressor 42 through a current controller 15 under control of the control device 26, and the battery 14 can be charged with the electric energy.

In this case, power running/regeneration drive control for the motor 16, charging/discharging control for the battery 14, drive control for the auxiliary devices such as the air compressor 42 (an EGR pump 49, a hydrogen circulation pump 75, and a coolant pump 82), and power generation electrical energy control of the fuel cell stack 18 performed through the current controller 15 are performed under control of the control device 26. For the purpose of brevity, only power lines through which large electrical energy flows, i.e., power lines between the fuel cell stack 18 and the current controller 15, between the current controller 15 and the battery 14, and between the motor 16 and the air compressor 42 are illustrated.

Electric energy of the battery 14 is directly supplied to the air compressor 42, and/or electric energy generated in power generation of the fuel cell stack 18 is supplied to the air compressor 42 through the current controller 15.

It should be noted that the control device 26 may be made up of a plurality of segments.

The fuel cell stack 18 has a fuel gas supply passage 36a for supplying the fuel gas (such as a hydrogen-containing gas) to the anode 32, and a fuel gas discharge passage 36b for discharging the fuel gas from the anode 32.

The fuel cell stack 18 has an oxygen-containing gas supply passage 38a for supplying an oxygen-containing gas (such as the air) to the cathode 34, and an oxygen-containing gas discharge passage 38b for discharging the oxygen-containing gas from the cathode 34.

The fuel cell stack 18 has a coolant supply passage 40a and a coolant discharge passage 40b as passages of a coolant in each of the power generation cells 28.

The oxygen-containing gas supply apparatus 20 includes an air compressor (air pump, oxygen-containing gas supply unit) 42 for compressing the atmospheric air and supplying the air. The air compressor 42 is provided in an air supply channel 44.

A humidifier 46 and a bypass channel 50 for bypassing the humidifier 46 through a valve 48 are provided in the air supply channel 44. The air supply channel 44 is connected to the oxygen-containing gas supply passage 38a of the fuel cell stack 18.

An air discharge channel 52 is connected to the oxygen-containing gas discharge passage 38b through the humidifier 46. An EGR (Exhaust Gas Recirculation) pump 49 is provided between the air discharge channel 52 and the air supply channel 44.

The EGR pump 49 recirculates some of the gas discharged from the oxygen-containing gas discharge passage 38b back to the oxygen-containing gas supply passage 38a.

An inlet stop valve 53 is provided on one side of the air compressor 42 where the air supply channel 44 is provided, and an input part of the bypass channel 57 for bypassing the air supply channel 44 is connected to the one side of the air compressor 42 through the valve 51.

An outlet stop valve 54 is provided in the air discharge channel 52, and a dilution device 56 is connected to a position of the air discharge channel 52 downstream of the outlet stop valve 54 through a back pressure control valve 55.

An output part of the bypass channel 57 is connected to a position between the back pressure control valve 55 and the dilution device 56.

The fuel gas supply apparatus 22 includes a high pressure hydrogen tank (pressure accumulator, fuel gas supply unit) 58 for storing high pressure hydrogen, and the high pressure hydrogen tank 58 is connected to the fuel gas supply passage 36a of the fuel cell stack 18 through the hydrogen supply channel 60. In the hydrogen supply channel 60, a shutoff valve 59, an injector 61 and an ejector 64 for pressure regulation are provided in the order named in the flow direction of the hydrogen gas.

An off gas channel (air discharge channel) 66 is connected to the fuel gas discharge passage 36b of the fuel cell stack 18. The off gas channel 66 is connected to a gas liquid separator 68, and a drain channel 70 for discharging a liquid component and a gas channel 72 for discharging a gas component are provided in the gas liquid separator 68. The gas channel 72 is connected to the ejector 64 through a circulation path 74 and a hydrogen circulation pump 75, and the gas channel 72 is connected to the dilution device 56 by operation of opening a purge valve 76. The drain channel 70 is connected to the dilution device 56 through a valve 78.

The dilution device 56 mixes the off gas (containing the hydrogen gas) discharged from the fuel gas discharge passage 36b of the fuel cell stack 18, and the off gas (containing the oxygen) discharged from the oxygen-containing gas discharge passage 38b of the fuel cell stack 18 to thereby dilute the gas so as to have hydrogen concentration of not more than a specified value.

The coolant supply apparatus 24 includes a coolant circulation channel 80 connected to the coolant supply passage 40a and the coolant discharge passage 40b of the fuel cell stack 18 for supplying the coolant in a circulating manner. In the coolant circulation channel 80, the coolant pump 82 is provided at a position adjacent to the coolant supply passage 40a, and a radiator 84 is provided at a position adjacent to the coolant discharge passage 40b.

The power generation cell 28 is provided with an impedance sensor 85 for measuring an impedance resistance value and electric potential.

Pressure sensors 92a, 92b, 92c, 92d, and 92e are provided at the air supply channel 44, the air discharge channel 52, the hydrogen supply channel 60, the off gas channel 66, and the outlet of the high pressure hydrogen tank 58, respectively. Hygrometers 94a, 94b are provided in the air supply channel 44 and the hydrogen supply channel 60, respectively. Thermometers 96a, 96b, 96c are provided in the off gas channel 66, the air discharge channel 52, and the coolant circulation channel 80, respectively.

[Normal Operation of the Fuel Cell System 12]

Normal operation of the fuel cell system 12 having the above structure will be described below.

In a state where the valve 51 is closed, air (oxygen-containing gas) is supplied to the air supply channel 44 through the air compressor 42 of the oxygen-containing gas supply apparatus 20. After this air passes through the humidifier 46 and is humidified, or after the air passes through the bypass channel 50 to bypass the humidifier 46, the air is supplied to the oxygen-containing gas supply passage 38a of the fuel cell stack 18.

The humidifier 46 collects water contained in the oxygen-containing gas discharged from the oxygen-containing gas discharge passage 38b, and humidifies the air supplied from the air compressor 42 using the collected water. By the function of the humidifier 46, the solid polymer electrolyte membrane 30 of the fuel cell stack 18 during power generation is kept in a humidified state suitable for power generation.

In the meanwhile, in the fuel gas supply apparatus 22, when the injector 61 is opened, the hydrogen gas (fuel gas) is supplied from the high pressure hydrogen tank 58 to the hydrogen supply channel 60. This hydrogen gas passes through the ejector 64, and then, the hydrogen gas is supplied to the fuel gas supply passage 36a of the fuel cell stack 18.

Further, in the coolant supply apparatus 24, by operation of the coolant pump 82, a coolant such as pure water, ethylene glycol, or oil is supplied from the coolant circulation channel 80 to the coolant supply passage 40a of the fuel cell stack 18.

The air is supplied from the oxygen-containing gas supply passage 38a to the cathode 34 of each of the power generation cells 28. In the meanwhile, the hydrogen gas is supplied from the fuel gas supply passage 36a to the anode 32 of each of the power generation cells 28. Therefore, in each of the power generation cells 28, the air supplied to the cathode 34 and the hydrogen gas supplied to the anode 32 are consumed in the electrochemical reactions in the electrode catalyst layers to generate electricity.

Then, the air supplied to and consumed at the cathode 34 is discharged into the oxygen-containing gas discharge passage 38b. The air flows through the air discharge channel 52, and flows into the dilution device 56. Likewise, the hydrogen gas supplied to and consumed at the anode 32 is discharged, as the off gas (the resulting gas after consumption of some of the fuel gas), into the fuel gas discharge passage 36b. After the off gas flows from the off gas channel 66 into the gas liquid separator 68 and the liquid water component is removed from the off gas, the off gas is suctioned into the ejector 64 from the gas channel 72 through the circulation path 74.

Further, the coolant supplied to the coolant supply passage 40a cools each of the power generation cells 28, and then, the coolant is discharged from the coolant discharge passage 40b. The coolant flows through the coolant circulation channel 80, and is cooled by the radiator 84, and then, by operation of the coolant pump 82, the coolant is supplied to the fuel cell stack 18 in a circulating manner.

Next, normal operation of the fuel cell vehicle 10 will be described.

[Normal Operation of the Fuel Cell Vehicle 10]

The control device 26 obtains load requirements of the loads based on the state of the fuel cell stack 18, the state of the battery 14, the state of the motor 16, the states of auxiliary devices such as the air compressor 42, and also based on inputs from various switches and various sensors (e.g., the SOC sensor 2, the vehicle velocity sensor 4, the accelerator pedal sensor 6), adjusts the load balance to thereby determine the load quantity allocated to the fuel cell stack 18, the load quantity allocated to the battery 14, and the load quantity allocated to the regenerative power supply such as the motor 16, and sends instructions to the current controller 15.

As a result, the fuel cell vehicle 10 is switched to a stop state (in which the fuel cell stack 18 is in a stoppage state (which will be sometimes referred to as "a soaking state") while the vehicle is stopped), an idling state ((a stopping and idling state where the vehicle is stopped while the fuel cell stack 18 is generating electric power (during stopping and idling)), or a traveling state (where the vehicle is traveling while the fuel cell stack 18 is generating electric power). It should be noted that examples of the stopping and idling state include states where the vehicle stops when the passengers get in/out of the vehicle, when goods are loaded on/unloaded from the vehicle, when the traffic signal is red, and when the preceding vehicle stops in the automated driving mode which enables a follow-up control in a traffic jam.

First Embodiment Example

Control Operation of Suppressing NV (Noise and Vibration) and High Potential Degradation when Operation of the Fuel Cell Vehicle 10 Transitions from the Stopping and Idling State to the Traveling State]

Next, an operation control method of the fuel cell vehicle 10 according to the embodiment of the present invention (control of suppressing NV (noise and vibration) sensed by passengers and control of suppressing high potential degradation of the fuel cell stack 18 when operation of the fuel cell vehicle 10 transitions from the stopping and idling state to the traveling state) will be described with reference to a time chart in FIG. 2.

Figure 2:
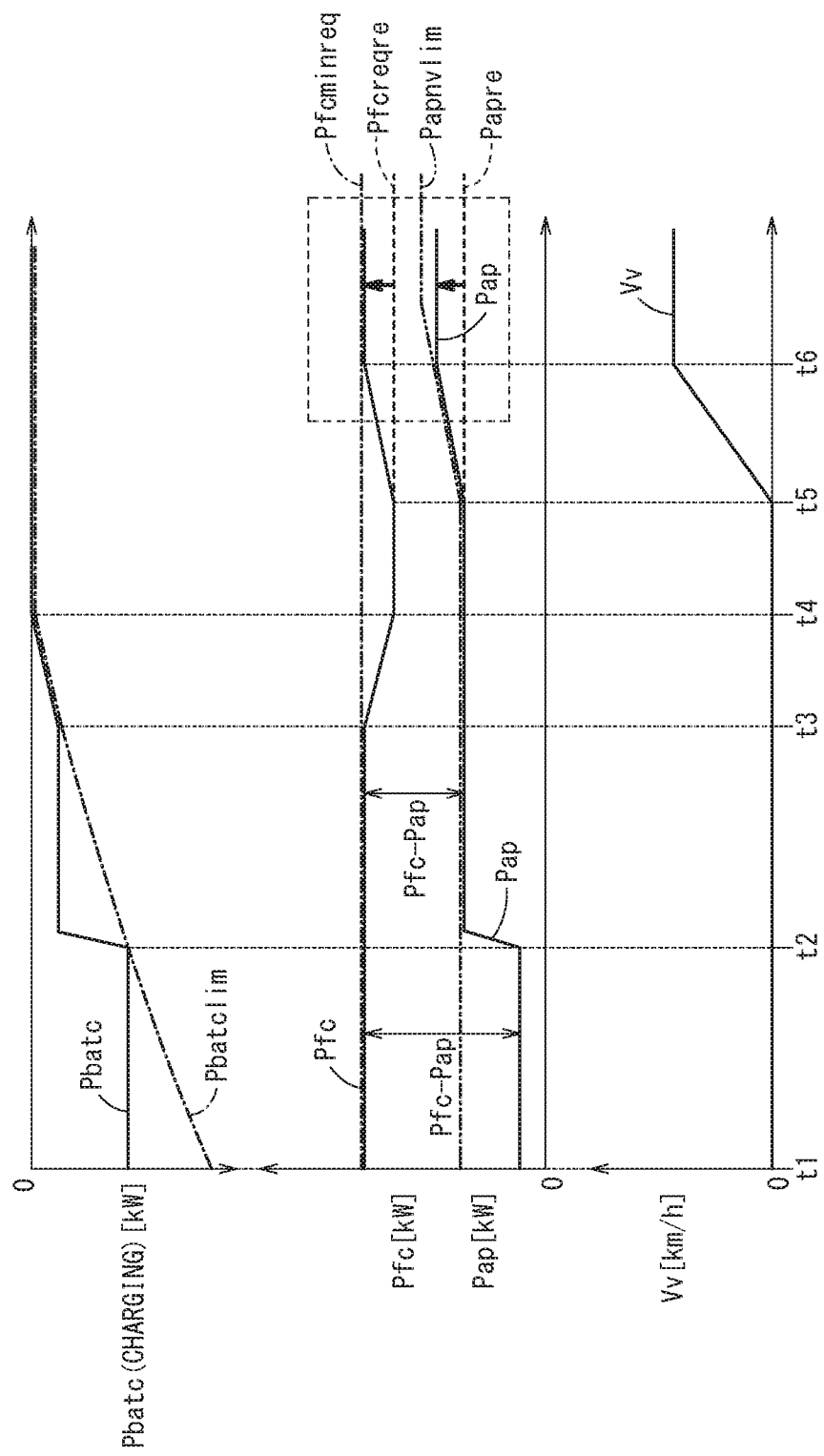
FIG. 2 is a time chart illustrating operation of a first embodiment example of a fuel cell vehicle according to the embodiment.

In the time chart of FIG. 2, the lateral axis denotes the time, and the vertical axis denotes: on the lower stage, the vehicle velocity Vv; on the middle stage, the quantity of electrical energy consumed by the air compressor 42 (air compressor electrical energy) Pap and the fuel cell power generation electrical energy (power generation electrical energy) Pfc; and on the upper stage, the charging electrical energy Pbatc with which the battery 14 is charged (battery charging electrical energy).

In the period from time point t1 to time point t5, since the vehicle velocity Vv is zero (Vv=0), the fuel cell stack 18 is controlled by the power generation control unit 26A into the power generation state of the stopping and idling state. At time point t5, the fuel cell vehicle 10 starts traveling. The period from time point t5 to time point t6 is an acceleration traveling period. A period from time point t6 is considered as a constant velocity traveling period.

In the period from time point t1 to time point t2, operation of the fuel cell stack 18 is in the stopping and idling state, and the fuel cell stack 18 performs power generation to generate constant power generation electrical energy Pfc. It should be noted that the constant power generation electrical energy Pfc is set, by the power generation control unit 26A, to be a minimum power generation required electrical energy Pfcminreq at which high potential degradation of the fuel cell stack 18 is not accelerated, i.e., a high load state is established for the load requirement.

In the period from time point t1 to time point t2, the quantity of electrical energy consumed by the air compressor 42 (air compressor electrical energy) Pap is kept constant at a relatively low level.

In the period from time point t1 to time point t2, basically, the differential electrical energy (Pfc−Pap) obtained by subtracting the air compressor electrical energy Pap from the power generation electrical energy Pfc is supplied as a battery charging electrical energy Pbatc to charge the battery 14 therewith, and the charging state SOC obtained by the SOC sensor 2 is increased.

Therefore, in the period from time point t1 to time point t2, the charging limit of the battery 14 (a remaining chargeable amount) Pbatclim is reduced gradually.

At time point t2, when the value of the differential electrical energy between the charging limit (the remaining chargeable amount) Pbatclim of the battery 14 and the battery charging electrical energy Pbatc becomes zero, in order to maintain the power generation state at the minimum power generation required electrical energy Pfcminreq where high potential degradation of the fuel cell stack 18 is not accelerated, a surplus power generation electrical energy consumption control unit 26B increases the rotational speed of the air compressor 42 at the time point t2, and thereby increases the air compressor electrical energy Pap up to the air compressor NV upper limit electrical energy Papnvlim which is the upper limit value of a tolerable NV (noise and vibration) level which is sensed by the passengers of the fuel cell vehicle 10 during the stopping and idling state.

At time point t2, the surplus power generation electrical energy consumption control unit 26B opens the valve 51 which causes the redundant oxygen-containing gas produced in the air compressor 42 to bypass the air supply channel but flow toward the dilution device 56. After time point t2, the valve opening amount of the valve 51 is increased in correspondence with increase in the rotational speed of the air compressor 42. In this manner, the surplus power generation electrical energy of the fuel cell stack 18 is consumed by the air compressor 42 to thereby prevent the excessive oxygen-containing gas from flowing into the air supply channel 44. Thus, the water content of the fuel cell stack 18 is controlled so that the fuel cell stack 18 can contain the suitable quantity of water.

The opening amount of the valve 51 is controlled by the surplus power generation electrical energy consumption control unit 26B. As a result, the excessive (redundant) oxygen-containing gas flows through the bypass channel 57, and is released to the outside (atmosphere) through the dilution device 56.

In this manner, in the period from time point t2 to time point t4, the air compressor electrical energy Pap is increased for the purpose of consumption of the surplus power generation electrical energy. In the period from time point t2 to time point t3, the air compressor electrical energy Pap is set to the air compressor NV upper limit electrical energy Papnvlim which is tolerable during the stopping and idling of the fuel cell vehicle 10 (tolerance limit of the NV (noise and vibration) of the air compressor 42 during the stopping and idling state).

Therefore, in the period from time point t2 to time point t3, basically, the differential electrical energy (Pfc−Pap) obtained by subtracting the air compressor electrical energy Pap from the power generation electrical energy Pfc is supplied as the battery charging electrical energy Pbatc (which is smaller than the battery charging electrical energy Pbatc in the period from time point t1 to time point t2) to charge the battery 14 therewith.

At time point t3, when the value of the differential electrical energy between the charging limit (the remaining chargeable amount) Pbatclim of the battery 14 and the battery charging electrical energy Pbatc becomes zero again, in order to avoid damage to the battery 14 due to excessive charging, in the period from time point t3 to time point t4, the power generation control unit 26A gradually decreases the power generation electrical energy Pfc up to a constant level at time point t4.

In the time period from time point t3 to time point t5, the power generation control unit 26A sets the power generation electrical energy Pfc at a level which is smaller than the minimum power generation required electrical energy Pfcminreq of the fuel cell stack 18 where the minimum accelerated degradation is tolerated.

At time point t5, the fuel cell vehicle 10 starts traveling. In the period from time point t5 to time point t6, the fuel cell vehicle 10 is placed in an acceleration state. At time point t5, the valve 51 is closed.

When the fuel cell vehicle 10 is in the traveling state in the period from time point t5 to time point t6 and after time point t6, even if the NV (noise and vibration) based on the air compressor 42 is increased in the vehicle compartment, the increased level of the NV (noise and vibration) can be tolerated by the passengers, because the road noise etc. is increased as well. In consideration of this point, the surplus power generation electrical energy consumption control unit 26B increases the setting value of the air compressor NV upper limit electrical energy Papnvlim in correspondence with (the value of) the vehicle velocity Vv, more specifically, in correspondence with the increase in the vehicle velocity Vv.

In the period from time point t5 to time point t6 during acceleration, the power generation control unit 26A increases the air compressor electrical energy Pap of the air compressor 42 in proportion to the increase in the setting value of the air compressor NV upper limit electrical energy Papnvlim, and increases the power generation electrical energy Pfc of the fuel cell stack 18 as well.

After time point t6 during the constant velocity traveling, the power generation control unit 26A sets the power generation electrical energy Pfc of the fuel cell stack 18 at the minimum power generation required electrical energy Pfcminreq where high potential degradation of the fuel cell stack 18 is not accelerated, and then power generation is continued while drive control of the motor 16 is performed.

In the period from time point t5 to time point t6, and after time point t6 during traveling, when the air compressor electrical energy Papre according to a comparative example is compared with the air compressor electrical energy Pap according to the first embodiment example, in order to continue power generation at the minimum power generation required electrical energy Pfcminreq which does not accelerate high potential degradation, the surplus power generation electrical energy consumption control unit 26B sets the air compressor electrical energy Pap according to the first embodiment at an electrical energy which is less than the air compressor NV upper limit electrical energy Papnvlim and larger than the air compressor electrical energy Papre according to the comparative example.

Stated otherwise, in the first embodiment example, control is performed so that some of the power generation electrical energy Pfc generated in the fuel cell stack 18 is discarded as some of the air compressor electrical energy Pap (Pap−Papre).

In the case of the air compressor electrical energy Papre according to the comparative example, the power generation electrical energy Pfc of the fuel cell stack 18 is set to the power generation electrical energy request Pfcreqre. Therefore, high potential degradation of the fuel cell stack 18 is accelerated.

In the above described control operation of suppressing high potential degradation of the fuel cell stack 18 when operation of the fuel cell vehicle 10 according to the first embodiment example transitions from the stopping and idling state to the traveling state, in particular, the air compressor electrical energy Pap is increased during transition from the stopping and idling state to the traveling state, in consideration of the upper limit of NV (noise and vibration) sensed by the passengers in the vehicle compartment. As a result, the situations (proportion) where the fuel cell power generation electrical energy Pfc satisfies the minimum power generation required electrical energy Pfcminreq are increased, and acceleration of high potential degradation of the fuel cell stack 18 is suppressed.

Second Embodiment Example

Control Operation of Suppressing NV (Noise and Vibration) and Control Operation of Suppressing High Potential Degradation when Operation of the Fuel Cell Vehicle 10 Transitions from the Traveling State to the Stopping and Idling State]

Next, an operation control method of the fuel cell vehicle 10 according to the embodiment of the present invention (control of suppressing NV (noise and vibration) sensed by passengers and control of suppressing high potential degradation when operation of the fuel cell vehicle 10 transitions from the traveling state to the stopping and idling state) will be described with reference to a time chart in FIG. 3.

Figure 3:
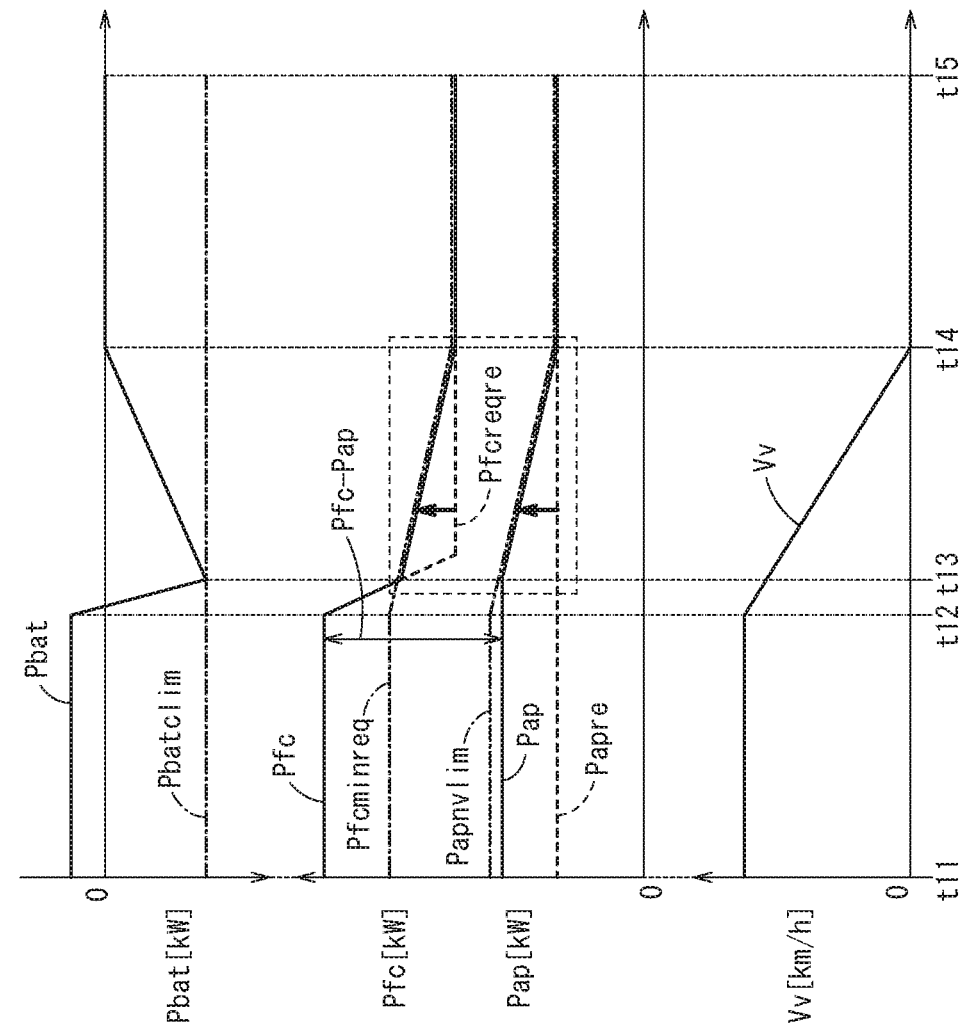
FIG. 3 is a time chart illustrating operation of a second embodiment example of the fuel cell vehicle according to the embodiment.

In the time chart of FIG. 3, the lateral axis denotes the time, and the vertical axis denotes: on the lower stage, the vehicle velocity Vv; on the middle stage, the quantity of electrical energy consumed by the air compressor 42 (air compressor electrical energy) Pap and the fuel cell power generation electrical energy Pfc; and on the upper stage, the battery electrical energy Pbat of the battery 14 (which is a battery discharging electrical energy when the value is not less than zero, and a battery charging electrical energy when the value is less than zero).

In a period from time point t11 to time point t12, the fuel cell vehicle 10 travels at a constant vehicle velocity Vv.

Further, in a period from time point t11 to time point t12, since the power generation control unit 26A sets the power generation electrical energy Pfc to be higher than the minimum power generation required electrical energy Pfcminreq and continues power generation, high potential degradation of the fuel cell stack 18 is suppressed.

Further, in the period from time point t11 to time point t12, the air compressor electrical energy Pap is set at an electrical energy which is larger than the air compressor electrical energy Papre according to the comparative example and smaller than the air compressor NV upper limit electrical energy Papnvlim which is an upper limit value of NV (noise and vibration) sensed by the passengers in the vehicle compartment.

Moreover, in the period from time point t11 to time point t12, basically, the motor 16 is driven by the composite electrical energy of the differential electrical energy (Pfc−Pap) obtained by subtracting the air compressor electrical energy Pap from the fuel cell power generation electrical energy Pfc and the battery electrical energy Pbat which is discharged from the battery 14.

In a deceleration period of the fuel cell vehicle 10 from time point t12 to time point t14, firstly, in the initial period from time point t12 to time point t13, the power generation control unit 26A sharply decreases the fuel cell power generation electrical energy Pfc.

At time point t13, when the battery electrical energy Pbat of the battery 14 reaches the battery charging limit Pbatclim, the surplus power generation electrical energy consumption control unit 26B gradually decreases the air compressor electrical energy Pap in accordance with the air compressor NV upper limit electrical energy Papnvlim where NV is tolerable, without sharply decreasing the air compressor electrical energy Pap stepwise down to the air compressor electrical energy Papre according to the comparative example. By decreasing the air compressor electrical energy Pap in this manner, without sharply decreasing the fuel cell power generation electrical energy Pfc after time point t13, it is possible to gradually decrease the fuel cell power generation electrical energy Pfc in accordance with the minimum power generation required electrical energy Pfcminreq. Thus, it is possible to suppress high potential degradation of the fuel cell stack 18 over the entire deceleration period from time point t12 to time point t14.

In the comparative embodiment, after time point t13, the fuel cell power generation electrical energy Pfc is sharply decreased, in accordance with the power generation required electrical energy Pfcreqre, to the minimum power generation required electrical energy Pfcminreq in the stopping and idling state after time point t14.

During the stopping and idling of the vehicle from time point t14 to time point t15, the power generation control unit 26A operates the air compressor 42 at the air compressor NV upper limit electrical energy Papnvlim so as to enable the fuel cell stack 18 to continue operation at the fuel cell minimum power generation required electrical energy Pfcminrec. Therefore, the value of the charging electrical energy Pbat with which the battery 14 is charged can be kept at zero.

In the control operation of suppressing high potential degradation when operation of the fuel cell vehicle 10 transitions from the traveling state to the stopping and idling state according to the second embodiment example, the power generation control unit 26A and the surplus power generation electrical energy consumption control unit 26B perform the control cooperatively, and in particular, during a deceleration stage surrounded by a dashed frame, decrease the air compressor electrical energy Pap in consideration of the air compressor NV upper limit electrical energy Papnvlim (NV upper limit). Accordingly, the situations (proportion) where the fuel cell power generation electrical energy Pfc satisfies the minimum power generation required electrical energy Pfcminreq are increased, and high potential degradation of the fuel cell stack 18 is suppressed.

Operation Principles of the Embodiment (First Embodiment Example and Second Embodiment Example)

Figure 4:
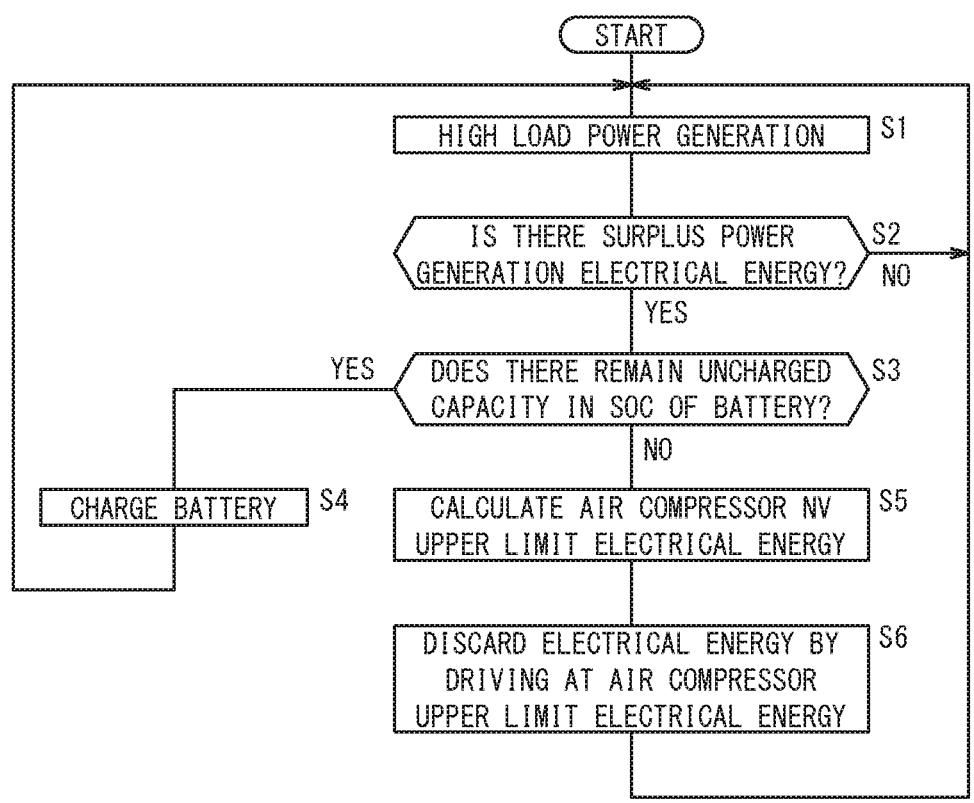
FIG. 4 is a flow chart illustrating an operation principle according to the embodiment.

Next, operation principles of the embodiment (first embodiment example and second embodiment example) will be described with reference to a flow chart in FIG. 4 and characteristics of vehicle velocity and air compressor upper limit electrical energy shown in FIG. 5.

In step S1, basically, the power generation control unit 26A controls power generation so that the fuel cell stack 18 generates power in the high load state where high potential degradation can be suppressed (a low voltage and large current output state of the fuel cell stack 18).

For this purpose, in step S2, it is determined whether or not there is surplus power generation electrical energy, i.e., whether or not the electrical energy calculated by subtracting the drive electrical energy for driving the loads (the motor 16, the air compressor 42, etc.) from the power generation electrical energy Pfc of the fuel cell stack 18 has a positive (+) value. If it is determined that there is no surplus power generation electrical energy (step S2: NO), high load power generation in step S1 is continued.

In the determination of step S2, if it is determined that there is surplus power generation electrical energy (step S2: YES), in step S3, the surplus power generation electrical energy consumption control unit 26B obtains information about whether or not there still remains an uncharged capacity in the charging state SOC of the battery 14 (whether or not the battery charging limit Pbatclim is not reached) through the SOC sensor 2.

If it is determined that there still remains an uncharged capacity in the charging state SOC of the battery 14 (i.e., the battery is not fully charged) (step S3: YES), in step S4, the surplus power generation electrical energy consumption control unit 26B charges the battery 14 with the surplus power generation electrical energy.

On the other hand, in the determination of step S3, if it is determined that there is no remaining uncharged capacity in the charging state SOC of the battery 14 (step S3: NO), in order to continue the high load power generation state of the fuel cell stack 18 as much as possible, in step S5, the air compressor NV upper limit electrical energy Papnvlim at a predetermined level where the passengers do not have the sense of discomfort about the NV (noise and vibration) in the vehicle compartment is calculated.

Figure 5:
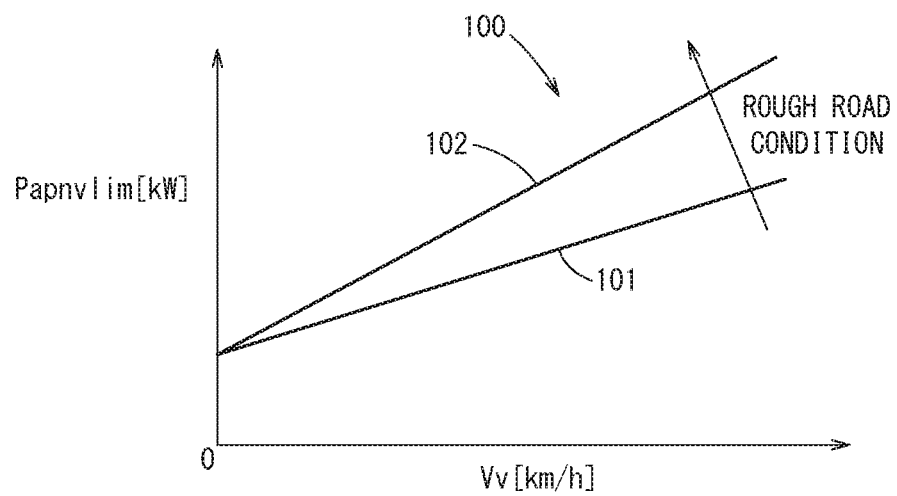
FIG. 5 is a graph showing characteristics of vehicle velocity and air compressor upper limit electrical energy, where the condition of a travel road is used as a parameter.

FIG. 5 is a correspondence table (map) 100 for calculating a threshold value as an air compressor NV upper limit electrical energy Papnvlim [kW] in correspondence with the vehicle velocity Vv [km/h].

Basically, the air compressor NV upper limit electrical energy Papnvlim has the minimum value in the stopping and idling state (Vv=0), and the air compressor NV upper limit electrical energy Papnvlim gets larger with increasing vehicle velocity Vv. Depending on the condition of the travel road as a parameter, the characteristics between vehicle velocity and air compressor NV upper limit electrical energy Papnvlim change. That is, in comparison with the characteristic 102 of a road which produces larger traveling noises such as a gravel road in a rough road condition, the characteristic 101 of a road which produces smaller traveling noises such as a concrete road has a small value (threshold value) for the purpose of suppressing generation of NV.

It should be noted that information about whether or not the travel road is in a rough road condition can be obtained using a navigation device, etc.

In step S5, the air compressor NV upper limit electrical energy Papnvlim [kW] depending on the vehicle velocity Vv [km/h] and the travel road condition are calculated, and thereafter, in step S6, the surplus power generation electrical energy consumption control unit 26B drives the air compressor 42 using the calculated air compressor NV upper limit electrical energy Papnvlim as the upper limit electrical energy, to consume (discard) surplus power generation electrical energy of the fuel cell stack 18 by using the air compressor 42.

In step S6, at the time of consuming the surplus power generation electrical energy by the air compressor 42, i.e., at the time of so called discarding of electrical energy, the valve opening amount of the valve 51 of the bypass channel 57 which guides the redundant oxygen-containing gas to the outside (atmosphere) through the dilution device 56 is adjusted to prevent the excessive oxygen-containing gas from flowing into the air supply channel 44.

Summary of the Embodiment (First and Second Embodiment Examples)

The fuel cell vehicle 10 according to the embodiment includes the fuel cell stack 18 for supplying electrical energy to the loads (auxiliary devices such as the motor 16 and the air compressor 42), the air compressor 42 as the oxygen-containing gas supply unit for supplying the oxygen-containing gas to the fuel cell stack 18, the high pressure hydrogen tank 58 as the fuel gas supply unit for supplying the fuel gas to the fuel cell stack 18, the power generation control unit 26A for controlling the power generation state of the fuel cell stack 18, the battery (energy storage device) 14, the SOC sensor 2 as the charging state acquisition unit for obtaining the charging state of the battery 14, the surplus power generation electrical energy consumption control unit 26B configured to charge the battery 14 with the surplus power generation electrical energy of the fuel cell stack 18 and control the drive state of the air compressor 42 up to the drive upper limit electrical energy (air compressor NV upper limit electrical energy Papnvlim) where the passengers can tolerate the NV (noise and vibration) in the passenger compartment, in correspondence with the charging state of the battery 14 obtained by the SOC sensor 2, to thereby consume the surplus electrical energy of the fuel cell stack 18, and the vehicle velocity sensor 4 as the vehicle velocity acquisition unit for obtaining the vehicle velocity Vv.

In this case, the surplus power generation electrical energy consumption control unit 26B variably sets the drive upper limit electrical energy (air compressor NV upper limit electrical energy Papnvlim) for the air compressor 42 so that the drive upper limit electrical energy depends on the vehicle velocity Vv obtained by the vehicle velocity sensor 4.

As described above, since the drive upper limit electrical energy (air compressor NV upper limit electrical energy Papnvlim) for the air compressor 42 is set variably depending on the vehicle velocity Vv, for example, it is possible to consume the surplus power generation electrical energy of the fuel cell stack 18 by the air compressor 42 within a range where the NV (noise and vibration) of the air compressor 42 does not give the passengers a sense of discomfort.

Further, the fuel cell vehicle 10 includes the accelerator pedal sensor 6 as the load requirement acquisition unit for obtaining load requirement of the loads such as the motor 16 required in traveling of the fuel cell vehicle 10. In this case, the power generation control unit 26A controls power generation of the fuel cell stack 18 in a power generation range higher than the load requirement obtained by the accelerator pedal sensor 6 and in which degradation of the fuel cell stack 18 can be suppressed. The surplus power generation electrical energy consumption control unit 26B causes the air compressor 42 to consume the surplus power generation electrical energy at the time of controlling degradation suppression power generation, by controlling the drive state of the air compressor 42. In this manner, it is possible to suppress high potential degradation of the fuel cell stack 18.

Further, in the case where the charging state of the battery 14 obtained by the SOC sensor 2 reaches a charging state threshold value, when the vehicle velocity Vv obtained by the vehicle velocity sensor 4 indicates the acceleration state (the time point t5 to the time point t6 in FIG. 2), the surplus power generation electrical energy consumption control unit 26B increases the drive upper limit electrical energy (air compressor NV upper limit electrical energy Papnvlim) for the air compressor 42 in correspondence with the vehicle velocity Vv. In this manner, it is possible to suitably consume the surplus electrical energy by using the air compressor 42, and suppress high potential degradation of the fuel cell stack 18.

Further, in the case where the charging state of the battery 14 obtained by the SOC sensor 2 reaches the charging state threshold value, when the vehicle velocity Vv obtained by the vehicle velocity sensor 4 indicates the deceleration state (the time point t12 to the time point t14 in FIG. 3), the surplus power generation electrical energy consumption control unit 26B decreases the drive upper limit electrical energy (air compressor NV upper limit electrical energy Papnvlim) for the air compressor 42 in correspondence with the vehicle velocity Vv. Also in this manner, it is possible to suitably consume the surplus electrical energy by means of the air compressor 42, and suppress high potential degradation of the fuel cell stack 18.

Furthermore, the air compressor 42 as the oxygen-containing gas supply unit is provided with the bypass channel 57 which is capable of releasing the oxygen-containing gas to the outside through the valve 51, and the redundant oxygen-containing gas which is present when the surplus electrical energy is consumed by the air compressor 42 is released to the outside (atmosphere) through the bypass channel 57 and the dilution device 56. In the structure, it is possible to control the water content of the fuel cell stack 18 so that the fuel cell stack 18 can contain the suitable quantity of water.

It should be noted that the present invention is not limited to the above described embodiment. It is a mater of course that various structures can be adopted.

What is claimed is:

1. A fuel cell vehicle comprising:
a fuel cell configured to supply electrical energy to a load including a motor and an air compressor, the air compressor configured to supply an oxygen-containing gas to the fuel cell;
a fuel gas tank configured to supply a fuel gas to the fuel cell;
a central processing unit configured to execute programs stored in a memory;
an energy storage device configured to be charged with electric energy of the fuel cell and supply electric energy to the air compressor;
a state of charge sensor configured to obtain a charging state of the energy storage device;
a vehicle velocity sensor configured to obtain vehicle velocity; and
a bypass channel configured to release an oxygen-containing gas from the air compressor to outside through a release valve,
wherein the central processing unit is configured to:
control the electric energy of the fuel cell,
charge the energy storage device with surplus power generation electrical energy of the fuel cell and controls a drive state of the air compressor up to a drive upper limit electrical energy, in correspondence with the charging state of the energy storage device obtained by the state of charge sensor, to thereby consume the surplus power generation electrical energy of the fuel cell,
variably set the drive upper limit electrical energy for the air compressor so that the drive upper limit electrical energy depends on the vehicle velocity obtained by the vehicle velocity sensor, and
increase a valve opening amount of the release valve for releasing the oxygen-containing gas to the outside in correspondence with increase in a rotational speed of the air compressor,
wherein the central processing unit is further configured to set the drive upper limit electrical energy for the air compressor to be a minimum value during a stopping and idling state of the fuel cell vehicle, and to be a value of the drive upper limit electrical energy increases in accordance with increase in the vehicle velocity; and
in a case of a road having a small traveling noise, the increase in the value of the drive upper limit electrical energy is suppressed in comparison with a case of a travel road being in a rough road condition.

2. The fuel cell vehicle according to claim 1, wherein the central processing unit is configured to:
obtain load requirement of the load required in traveling of the fuel cell vehicle;
control power generation of the fuel cell in a power generation range higher than the load requirement obtained and in which degradation of the fuel cell is suppressed; and
cause the air compressor to consume the surplus power generation electrical energy at a time of controlling degradation suppression power generation, by controlling the drive state of the air compressor.

3. The fuel cell vehicle according to claim 1, wherein, in a case where the charging state of the energy storage device obtained by the state of charge sensor reaches a charging state threshold value, when the vehicle velocity obtained by the vehicle velocity sensor indicates an acceleration state, the central processing unit is further configured to increase the drive upper limit electrical energy for the air compressor in correspondence with the vehicle velocity.

4. The fuel cell vehicle according to claim 1, wherein in a case where the charging state of the energy storage device obtained by the state of charge sensor reaches a charging state threshold value, when the vehicle velocity obtained by the vehicle velocity sensor indicates a deceleration state,
the central processing unit is configured to decrease the drive upper limit electrical energy for the air compressor in correspondence with the vehicle velocity.

5. The fuel cell vehicle according to claim 1, wherein
during a stopping and idling state of the fuel cell vehicle where a value of the vehicle velocity is zero, the central processing unit is configured to controls control power generation of the fuel cell to be in a high load state where high potential degradation is suppressed; and
charge the energy storage device with surplus power generation electrical energy, and when there is no more uncharged capacity of the energy storage device, increases a rotational speed of the air compressor to thereby increase the uncharged capacity.

6. The fuel cell vehicle according to claim 5, wherein the central processing unit is configured to increase the rotational speed of the air compressor to thereby increase electrical energy for the air compressor to an upper limit value of a noise and vibration level where noise and vibration during the stopping and idling state of the fuel cell vehicle can be tolerated by a passenger of the fuel cell vehicle.

7. A fuel cell vehicle comprising:
a fuel cell configured to supply electrical energy to a load including a motor and an air compressor, the air compressor configured to supply an oxygen-containing gas to the fuel cell;
a fuel gas tank configured to supply a fuel gas to the fuel cell;
a central processing unit configured to execute programs stored in a memory;
an energy storage device configured to be charged with electric energy of the fuel cell and supply electric energy to the air compressor;
a state of charge sensor configured to obtain a charging state of the energy storage device;
a vehicle velocity sensor configured to obtain vehicle velocity; and
a bypass channel configured to release an oxygen-containing gas from the air compressor to outside through a release valve,
wherein the central processing unit is configured to:
control the electric energy of the fuel cell,
charge the energy storage device with surplus power generation electrical energy of the fuel cell and controls a drive state of the air compressor up to a drive upper limit electrical energy, in correspondence with the charging state of the energy storage device obtained by the state of charge sensor, to thereby consume the surplus power generation electrical energy of the fuel cell,
variably set the drive upper limit electrical energy for the air compressor so that the drive upper limit electrical energy depends on the vehicle velocity obtained by the vehicle velocity sensor, and
increase a valve opening amount of the release valve for releasing the oxygen-containing gas to the outside in correspondence with increase in a rotational speed of the air compressor, wherein the central processing unit is further configured to lower the electrical energy generated by the fuel cell when a differential electrical energy between a charging limit of the energy storage device and the electrical energy in the energy storage device charged with the surplus power generation electrical energy of the fuel cell becomes zero.

8. A fuel cell vehicle comprising:

a fuel cell configured to supply electrical energy to a load including a motor and an air compressor, the air compressor configured to supply an oxygen-containing gas to the fuel cell;

a fuel gas tank configured to supply a fuel gas to the fuel cell;

a central processing unit configured to execute programs stored in a memory;

an energy storage device configured to be charged with electric energy of the fuel cell and supply electric energy to the air compressor;

a state of charge sensor configured to obtain a charging state of the energy storage device;

a vehicle velocity sensor configured to obtain vehicle velocity; and a bypass channel configured to release an oxygen-containing gas from the air compressor to outside through a release valve, wherein the central processing unit is configured to:
control the electric energy of the fuel cell,
charge the energy storage device with surplus power generation electrical energy of the fuel cell and controls a drive state of the air compressor up to a drive upper limit electrical energy, in correspondence with the charging state of the energy storage device obtained by the state of charge sensor, to thereby consume the surplus power generation electrical energy of the fuel cell,
variably set the drive upper limit electrical energy for the air compressor so that the drive upper limit electrical energy depends on the vehicle velocity obtained by the vehicle velocity sensor, and
increase a valve opening amount of the release valve for releasing the oxygen-containing gas to the outside in correspondence with increase in a rotational speed of the air compressor, wherein the central processing unit is further configured to increase the drive upper limit electrical energy of the air compressor as the vehicle velocity increases, in order to allow an electrical energy consumed by the air compressor to increase as the vehicle velocity increases.

9. A fuel cell vehicle comprising:

a fuel cell configured to supply electrical energy to a load including a motor and an air compressor, the air compressor configured to supply an oxygen-containing gas to the fuel cell;

a fuel gas tank configured to supply a fuel gas to the fuel cell;

a central processing unit configured to execute programs stored in a memory;

an energy storage device configured to be charged with electric energy of the fuel cell and supply electric energy to the air compressor;

a state of charge sensor configured to obtain a charging state of the energy storage device;

a vehicle velocity sensor configured to obtain vehicle velocity; and a bypass channel configured to release an oxygen-containing gas from the air compressor to outside through a release valve, wherein the central processing unit is configured to:
control the electric energy of the fuel cell,
charge the energy storage device with surplus power generation electrical energy of the fuel cell and controls a drive state of the air compressor up to a drive upper limit electrical energy, in correspondence with the charging state of the energy storage device obtained by the state of charge sensor, to thereby consume the surplus power generation electrical energy of the fuel cell,
variably set the drive upper limit electrical energy for the air compressor so that the drive upper limit electrical energy depends on the vehicle velocity obtained by the vehicle velocity sensor, and
increase a valve opening amount of the release valve for releasing the oxygen-containing gas to the outside in correspondence with increase in a rotational speed of the air compressor, wherein the central processing unit is configured to gradually lower the electrical energy generated by the fuel cell as the vehicle velocity decreases.

* * * * *